United States Patent
Jang et al.

(10) Patent No.: US 9,288,729 B2
(45) Date of Patent: Mar. 15, 2016

(54) METHOD FOR PERFORMING A CHANGE OF MODE IN DEVICES DIRECTLY COMMUNICATING WITH EACH OTHER IN A WIRELESS CONNECTION SYSTEM, AND APPARATUS FOR SAME

(75) Inventors: Jiwoong Jang, Anyang-si (KR); Hyunsoo Ko, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 14/237,811

(22) PCT Filed: Aug. 31, 2012

(86) PCT No.: PCT/KR2012/006968
§ 371 (c)(1),
(2), (4) Date: Feb. 7, 2014

(87) PCT Pub. No.: WO2013/032259
PCT Pub. Date: Mar. 7, 2013

(65) Prior Publication Data
US 2014/0185587 A1    Jul. 3, 2014

Related U.S. Application Data

(60) Provisional application No. 61/529,252, filed on Aug. 31, 2011.

(51) Int. Cl.
*H04W 4/00* (2009.01)
*H04W 36/14* (2009.01)
(Continued)

(52) U.S. Cl.
CPC .............. *H04W 36/14* (2013.01); *H04W 36/00* (2013.01); *H04W 36/0005* (2013.01); *H04W 76/043* (2013.01)

(58) Field of Classification Search
None
See application file for complete search history.

(56) References Cited

U.S. PATENT DOCUMENTS

| 2006/0168343 | A1  | 7/2006 | Ma et al. |
| 2007/0115884 | A1* | 5/2007 | Shang et al. ................... 370/331 |

(Continued)

FOREIGN PATENT DOCUMENTS

| JP | 2004-248180 | 9/2004 |
| JP | 2008-035372 | 2/2008 |

(Continued)

OTHER PUBLICATIONS

PCT International Application No. PCT/KR2012/006968, Written Opinion of the International Searching Authority dated Feb. 19, 2013, 18 pages.

(Continued)

*Primary Examiner* — Otis L Thompson, Jr.
(74) *Attorney, Agent, or Firm* — Lee, Hong, Degerman, Kang & Waimey

(57) ABSTRACT

The present invention relates to a method for determining whether a mode change condition for performing a hand-over to a cellular network through which devices communicate with each other is satisfied, transmitting a mode change instruction message to a base station when the mode change condition is satisfied, receiving a mode change command message for starting a mode change from the base station, transmitting a first data packet index with respect to a data packet transmitted to a second device at a final stage through the communication between the devices to the base station, ending the communication with the second device when the inter-device communication end request message is received from the base station, and transmitting data to the second device through the cellular network.

9 Claims, 9 Drawing Sheets

(51) Int. Cl.
*H04W 36/00* (2009.01)
*H04W 76/04* (2009.01)

(56) References Cited

U.S. PATENT DOCUMENTS

| | | | |
|---|---|---|---|
| 2007/0153747 A1* | 7/2007 | Pan et al. | 370/338 |
| 2010/0279672 A1* | 11/2010 | Koskela et al. | 455/418 |
| 2011/0275382 A1* | 11/2011 | Hakola et al. | 455/452.2 |
| 2012/0020213 A1* | 1/2012 | Horneman et al. | 370/231 |
| 2013/0150051 A1* | 6/2013 | Van Phan et al. | 455/437 |

FOREIGN PATENT DOCUMENTS

| | | |
|---|---|---|
| KR | 2002-0044892 | 6/2002 |
| WO | 2011/020180 | 2/2011 |

OTHER PUBLICATIONS

PCT International Application No. PCT/KR2012/006968, Written Opinion of the International Searching Authority dated Feb. 19, 2013, 11 pages.

European Patent Office Application Serial No. 12827900.7, Search Report dated Jul. 7, 2015, 14 pages.

* cited by examiner

METHOD FOR PERFORMING A CHANGE OF MODE IN DEVICES DIRECTLY COMMUNICATING WITH EACH OTHER IN A WIRELESS CONNECTION SYSTEM, AND APPARATUS FOR SAME

CROSS-REFERENCE TO RELATED APPLICATIONS

This application is the National Stage filing under 35 U.S.C. 371 of International Application No. PCT/KR2012/006968, filed on Aug. 31, 2012, which claims the benefit of U.S. Provisional Application Ser. No. 61/529,252, filed on Aug. 31, 2011, the contents of which are all hereby incorporated by reference herein in their entirety.

TECHNICAL FIELD

The present invention relates to a wireless access system supporting a direct communication (using in parallel with device to device communication) between devices. The present invention relates to a method of performing a seamless communication between devices, a method of changing a mode, and an apparatus therefor. More particularly, the present invention relates to a method for devices performing a device to device communication to make a handover (mode change) to a cellular network.

BACKGROUND ART

In the following description, a device to device communication environment of the present invention is briefly explained.

A device to device communication (hereinafter abbreviated D2D) communication literally means a communication between one electronic device and another electronic device. In a broad sense, the D2D communication may mean a communication between electronic devices or a communication between a human-controllable device and a machine. Recently, the D2D communication may generally indicate a wireless communication performed between electronic devices without human involvement.

In the early 1990's, in which the concept of the D2D communication has been initially introduced, the D2D communication has been recognized as remote control or telematics or the like and derivative markets of the D2D communication were very limitative. Yet, the D2D communication has grown rapidly for past few years and has become the globally noteworthy markets. Specifically, the D2D communication has considerably influence on such field as POS (point of sales), fleet management, remote monitoring of machinery and equipment, and the like. D2D communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the D2D communication, every machine equipped with SIM (subscriber identity module) card enables data transmission and reception and is capable of remote management and control. For instance, as D2D communication technology is usable for numerous devices and equipment including vehicles, trucks, trains, containers, auto-vending machines, gas tanks and the like.

According to a related art, since a user equipment is generally managed in an individual unit, a communication between a base station and a user equipment is mainly performed by one-to-one communication scheme. If many D2D devices communicate with a base station using the one-to-one communication scheme, a network overload may occur due to signaling with the base station. As mentioned in the foregoing description, if the D2D communication is rapidly spread, overhead occurred by communication between D2D devices or communication between D2D devices and base station may cause a problem.

According to a related art, study on a method of performing a seamless communication in case of a poor D2D connection state and a method of performing a mode change (handover to a cellular network) while performing a direct communication between devices is not satisfactory.

DISCLOSURE OF THE INVENTION

Technical Tasks

The present invention is devised to solve the aforementioned technical problem. One object of the present invention is to provide a method of efficiently performing a communication with a D2D device.

A different object of the present invention is to provide a method of seamlessly transmitting data in case of a poor link quality between devices in a device to device communication.

A further different object of the present invention is to provide a method of making a handover to a cellular network in case of a poor link quality between devices in a device to device communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing a mode change, which is performed by a first device performing a device-to-device communication in a wireless access system includes the steps of determining whether a mode change condition for making a handover to a cellular network is satisfied while performing the device-to-device communication, if the mode change condition is satisfied, transmitting a mode change indication message to a base station, receiving a mode change command message from the base station to initiate the mode change, transmitting a first data packet index for a data packet, which is lastly transmitted by a second device via the device-to-device communication, to the base station, if a device-to-device communication termination request message is received from the base station, terminating the device-to-device communication with the second device, and transmitting data to the second device via the cellular network.

The method may further include the step of transmitting a second data packet index for a data packet, which is lastly received by the second device via the device-to-device communication, to the base station.

The device-to-device communication termination request message may include a third data packet index for a data packet firstly transmitted via the cellular network.

The third data packet index may correspond to a smaller value among the first data packet index and the second data packet index.

The mode change indication message may include quality information of a link between the first device and the second device.

To further achieve these and other advantages and in accordance with the purpose of the present invention, according to a different embodiment, a method of performing a mode change, which is performed by a first device performing a device-to-device communication in a wireless access system includes the steps of determining whether a mode change condition for making a handover to a cellular network is satisfied while performing the device-to-device communication, if the mode change condition is satisfied, transmitting a RACH request message to a base station, transmitting a mode change indication message to the base station via a resource obtained by transmitting the RACH request message, receiving a mode change command message from the base station to initiate the mode change, transmitting a first data packet index for a data packet, which is lastly transmitted by a second device via the device-to-device communication, to the base station, if a device-to-device communication termination request message is received from the base station, terminating the device-to-device communication with the second device, and transmitting data to the second device via the cellular network.

The method may further include the step of transmitting a second data packet index for a data packet, which is lastly received by the second device via the device-to-device communication, to the base station.

The device-to-device communication termination request message may include a third data packet index for a data packet firstly transmitted via the cellular network.

The third data packet index may correspond to a smaller value among the first data packet index and the second data packet index.

The mode change indication message may include quality information of a link between the first device and the second device.

To further achieve these and other advantages and in accordance with the purpose of the present invention, according to a further different embodiment, a device for performing a mode change while performing a device-to-device communication in a wireless access system includes a radio frequency (RF) unit configured to include a transmitter and a receiver and a processor configured to support the mode change, the processor configured to determine whether a mode change condition for making a handover to a cellular network is satisfied while performing the device-to-device communication, if the mode change condition is satisfied, the processor configured to transmit a mode change indication message to a base station via the RF unit, the processor configured to receive a mode change command message from the base station via the RF unit to initiate the mode change, the processor configured to transmit a first data packet index for a data packet, which is lastly transmitted by a second device via the device-to-device communication, to the base station via the RF unit, if a device-to-device communication termination request message is received from the base station, the processor configured to terminate the device-to-device communication with the second device, the processor configured to transmit data to the second device via the cellular network using the RF module.

The device-to-device communication termination request message may include a third data packet index for a data packet firstly transmitted via the cellular network.

The third data packet index may correspond to a smaller value among the first data packet index and a second data packet index for a data packet, which is lastly received by the second device via the device-to-device communication.

The mode change indication message may include quality information of a link between the first device and the second device.

If the mode change condition is satisfied, the processor may transmit a RACH request message to the base station via the RF unit and transmit the mode change indication message to the base station via a resource obtained by transmitting the RACH request message using the RF unit.

Additional advantage, purpose, features of the present invention can be easily understood in a manner that those having ordinary skill in the technical field implement the present invention based on following explanation. Moreover, the present invention may have unexpected advantage in a manner that those having ordinary skill in the technical field implement the present invention based on the following explanation.

Advantageous Effects

According to embodiments of the present invention, the present invention provides the following effects.

First of all, D2D devices can efficiently perform a communication in a manner of adaptively changing a mode while performing device to device communication or cellular communication.

Secondly, in a device to device communication, D2D devices can seamlessly transmit/receive data despite link quality of the device to device communication is poor.

Thirdly, in a device to device communication, if link quality of the device to device communication is poor, D2D devices can seamlessly transmit/receive data in a manner of making a handover to a cellular communication.

Additional advantage, purpose, features of the present invention can be easily understood in a manner that those having ordinary skill in the technical field implement the present invention based on following explanation. Moreover, the present invention may have unexpected advantage in a manner that those having ordinary skill in the technical field implement the present invention based on the following explanation.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
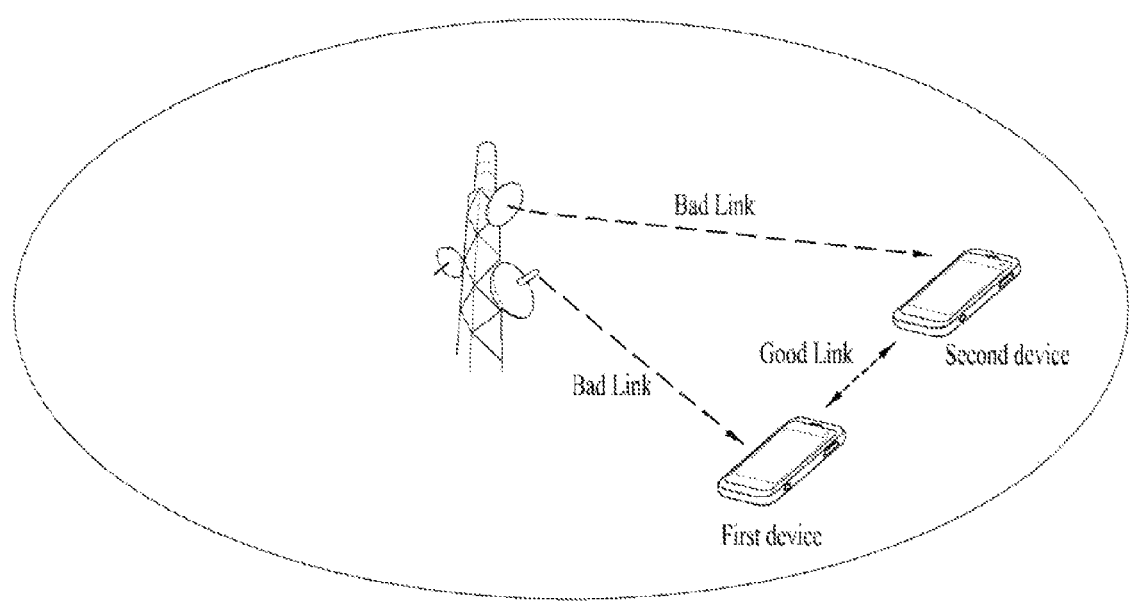
FIG. 1 is a diagram for an example of performing a device to device communication.

Embodiments of the present invention provide a method of seamlessly communicating between devices, a method of switching a communication to a cellular network, and apparatus therefore.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In explaining drawings, procedures or steps probably capable of making a point of the present invention unclear are not described. And, procedures or steps capable of being understood by those having ordinary skill in the technical field are not described as well.

In this specification, embodiments of the present invention are described centering on the data transmission/reception relations between a base station and a mobile station. In this case, the base station has a meaning of a terminal node of a network directly communicating with a mobile station. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other network nodes except the base station. 'Base station (BS)' may be substituted with such a terminology as a fixed station, a Node B, an eNode B (eNB), an advanced base station (ABS), an access point (AP) and the like.

In the present invention, a D2D device means a terminal for performing a communication between devices. The D2D device may be simply called a device. And, the D2D device may be substituted with such a terminology as an MS (mobile station), a UE (user equipment), an SS (subscriber station), an MSS (mobile subscriber station), a mobile terminal, a terminal, a device, an M2M (machine to machine) device, or the like.

And, a transmitting end indicates a fixed and/or mobile node transmitting a data or audio service and a receiving end indicates a fixed and/or mobile node receiving a data or audio service. Hence, a mobile station may become a transmitting end and a base station may become a receiving end in uplink. Similarly, a mobile station may become a receiving end and a base station may become a transmitting end in downlink.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

In the following description, embodiment of the present invention is explained in detail with reference to the attached drawings to enable those having ordinary skill in the technical field to which the present invention belongs to easily implement the present invention. Yet, the present invention can be implemented in various forms and may be non-limited by the embodiment explained in this specification. In order to clearly explain the present invention, a part irrelevant to the explanation is omitted. Wherever possible, the same reference numbers will be used throughout the present specification to refer to the same or like parts.

In the present specification, such a terminology as 'include' and the like should be construed not as excluding a different component but as further including additional components unless there exists an opponent written citation in the present specification. Moreover, such a terminology as 'unit', 'module', or the like used in the present specification means a unit for processing at least one function or operation of the present invention and it can be implemented by a hardware, a software, or a combination thereof.

Specific terminologies used in the following description are provided to help understand the present invention and the use of the specific terminologies can be modified into a different form in a range of not deviating from the technical idea of the present invention.

1. The Generals of Device to Device Communication

In the present specification, a device to device (D2D) communication means a method of directly transmitting and receiving data between devices. In this case, although each of the devices transmits and receives data via the D2D communication, prescribed control information for a direct communication between devices can be provided by a base station. Hence, the D2D communication is different from a Bluetooth communication, an infrared communication, or the like which performs a communication without an involvement of a base station.

Generally, a first device exchanges data and/or control information with a base station via a second device. Yet, in some cases, the first device may directly exchange data and/or control information with the base station. In particular, the first device may directly exchange data with the base station in consideration of a channel state between the first device and the base station and a channel state between the first device and the second device. In this case, the data and/or control information directly exchanged between the first device and the base station may be identical to the data and/or control information exchanged with the base station via the second device or may be not.

A communication between devices can be used in a manner of being mixed with such a terminology as a device to device communication (D2D communication or M2M communication), a peer to peer communication (P2P communication), or the like. For clarity, embodiments of the present invention are explained in a manner that the communication between devices is commonly called a D2D communication in the following description. And, a D2D device (or device) means a user equipment that supports the D2D communication in the present specification.

Meanwhile, the present invention is explained in a manner that all nodes except a D2D device are commonly called a base station in the present invention. For instance, a relay node, an antenna node of a DAS (distributed antenna system), and the like are commonly called a base station in the present invention in the way that they are all access points to access the base station.

FIG. 1 is a diagram for an example of a method of performing a device to device communication. Specifically, FIG. 1 is a diagram for an example of performing a D2D communication performed by two D2D devices (first device and second device) adjacent to each other in a cell edge.

A most significant purpose of a D2D communication is to save power/resource in a manner of establishing a direct link between devices of a good direct connection channel state (e.g., devices adjacent to each other) compared to a communication via a base station. In particular, as depicted in FIG. 1, a D2D communication is effective for devices (first device and second device) adjacent to each other in a cell edge. In this case, if the D2D communication is not performed (if a base station communicates with each of the devices, respectively), since each user equipment transceives data with a base station of a poor channel state, consumption of resource/power increases.

In the aforementioned D2D communication process, if a D2D device moves, phenomenon of failing in data transmission may occur due to channel quality deterioration and disconnection of a link between D2D devices.

2. Method of Performing Handover with Relay Device while a D2D Communication is Performed In the following description, a method of maintaining a D2D communication with a relay scheme via a third D2D device while the D2D communication is performed is proposed for a seamless data transmission between D2D devices performing the D2D communication. The proposed method can be applied to both a scheme (controlled D2D) of performing a D2D communication based on control information received from a base station and a scheme (uncontrolled D2D) of performing a D2D communication between D2D devices without an involvement of the base station.

In the following description, a relay device operating as a relay may correspond to a base station (e.g., eNB in LTE/LTE-A system, ANS in 802.16e/m system, and the like) in a cellular network (e.g., LTE/LTE-A system, 802.16e/m system, and the like) as well as a D2D device. In this case, if the relay device corresponds to the base station, it means that a D2D communication is handed over (transmission mode change) to a cellular network. A case that the relay device becomes a base station shall be explained in detail in a third passage.

For clarity, assume that 2 D2D devices perform a D2D communication in the following description, by which the present invention may be non-limited. The present invention may be identically applied to a case that two or more D2D devices simultaneously perform a D2D communication as well.

2. 1. Procedure of Handover Via Relay Device 2. 1. 1. Device Search

If link quality of a D2D communication drops below a device search threshold, a D2D device performing the D2D communication measures channel quality with a neighboring device and searches for a device suitable for using as a relay. The device search threshold is quality of a communication link between devices which becomes a reference to search for a relay device. In this case, the D2D device can transmit a scan indicator (SCAN IND) message to a counterpart D2D device to enable the counterpart D2D device to measure channel quality as well.

2. 1. 1. 1. In Case of not Periodically Disseminating a Reference Signal

If a neighboring device does not periodically disseminate a reference signal used for measuring channel quality, a D2D device performing a D2D communication transmits a reference signal request message configured to make a request for transmitting a reference signal to neighboring devices in a broadcast scheme.

Transmission of the reference signal request message can be performed by one of the two D2D devices performing the D2D communication or both of the D2D devices. If one of the D2D devices broadcasts the reference signal request message, the D2D device, which has broadcasted the reference signal request message, can transmit a notification or indication message for notifying that the reference signal request message is broadcasted to another D2D device.

After broadcasting the reference signal request message, the D2D device performing the D2D communication can measure channel quality with a neighboring device immediately or in a prescribed time. If one of the D2D devices broadcasts the reference signal request message, another D2D device can measure channel quality with a neighboring device immediately or in a prescribed time after the notification or indication message for notifying that the reference signal request message is broadcasted is received.

2. 1. 1. 2. In Case of Periodically Disseminating a Reference Signal

If a neighboring device periodically disseminates a reference signal used for measuring channel quality, a D2D device performing a D2D communication measures channel quality with the neighboring device in a manner of receiving the reference signal.

2. 1. 2. Measurement of Channel Quality

In order for D2D devices (first device and second device) performing a D2D communication to perform a D2D communication via a third device (relay device), quality of two links (a link between the first device and the relay device and a link between the second device and the relay device) for connecting the three devices with each other should be a good condition. Hence, it is preferable to perform a channel measurement in both D2D devices. Channel quality measurement can be performed in both D2D devices performing a D2D communication as follows.

2. 1. 2. 1. Measurement of Channel Quality in One Device First

Among the two D2D devices performing a D2D communication, one device (first device) may preferentially measure channel quality. For instance, the D2D device (first device), which has broadcasted a reference signal request message in the aforementioned 2. 1. 1. 1. Passage, may preferentially measure channel quality.

The first device generates a first list of a device, which includes channel quality greater than a channel quality threshold, using a value resulted from performing the channel quality measurement. The channel quality threshold is channel quality becoming a reference to select a device suitable for operating as a relay device among neighboring devices. Having generated the first list, the first device transmits the first list to a D2D device (second device) performing a D2D communication via a device report.

Having received the first list, the D2D device (second device) measures channel quality in a manner of receiving a reference signal of the device only included in the first list. In particular, instead of measuring channel quality with all neighboring devices, the second device measures channel quality with the device included in the first list only. Having measured the channel quality, the second device generates a second list in a manner of selecting one or a plurality of devices included in the first list. Having generated the second list, the second device transmits the second list to the first device via a device selection.

If the second device selects one device in the first list, the selected one device can be determined as a relay device. If the second device selects a plurality of devices in the first list as a candidate group, the first device, which has received the second list, determines a relay device from among the devices included in the second list and may be then able to notify the relay device to the second device.

As mentioned in the foregoing description, if one D2D device measures channel quality with all neighboring devices only, there may exist advantage in terms of power of devices.

2. 1. 2. 2. Measurement of Channel Quality Performed by Two Devices at the Same Time Two D2D devices performing a D2D communication can measure channel quality at the same time.

A first and second device respectively measure channel quality and generate a first and second list of a device including channel quality greater than a channel quality threshold. The first device transmits the first list to the second device via a device report. The second device transmits the second list to the first device via the device report.

One of the first and the second device determines a relay device with reference to a received/generated list and transmit it to the counterpart D2D device via a device selection.

According to the method described in the present passage, since two D2D devices measure channel quality at the same time, there exists less time delay compared to the method described in the 2. 1. 2. 1. passage.

2. 1. 3. Link Reconfiguration

After a relay device is determined, if link quality between D2D devices drops below a link reconfiguration threshold, a link reconfiguration process to use the relay device may be performed. In particular, the link reconfiguration threshold is link quality between D2D devices becoming a reference to start the link reconfiguration process. In this case, the link reconfiguration threshold may be identical to a device search threshold or may be different from the device search threshold. Yet, if the two thresholds are different from each other, it is preferable that the link reconfiguration threshold is smaller than the device search threshold.

D2D devices performing a D2D communication transmit a handover request (HO REQ) message to a relay device. In this case, one of the D2D devices performing the D2D communication may transmit the handover request message to the relay device. Having transmitted the handover request message, the D2D device transmits an identical handover request message to a remaining D2D device (a D2D device not transmitted the handover request message) performing the D2D communication to inform the D2D device that a handover process has started. Moreover, the D2D device, which has transmitted the handover request message, may transmit a separate handover indication message instead of the handover request message to the remaining D2D device to inform that the handover process has started.

When a relay device is determined by a D2D device, the D2D device can transmit a handover indication message including information on the relay device. Having received the handover indication message, a D2D device can transmit a handover request message to the relay device. Having received the handover indication message, the D2D device can transmit a response message for indicating a reception of the handover indication message to the D2D device, which has transmit the handover indication message.

2. 1. 4. Handover Initiation

Before a link between a D2D device performing a D2D communication and a relay device is completely established, a communication between legacy D2D devices and a communication with the relay device can be alternately performed. In this case, a handover mode (HO MOD) or a handover reentry mode (HO Reentry Mode) can be configured to define an operation of the D2D device. For clarity, it is commonly called a handover mode in the following description. The handover mode is configured by an indication of the relay device or may be configured in advance in the D2D device.

For instance, if the handover mode corresponds to 1, a communication with the relay device for a handover and a communication between legacy devices are alternately performed before a link with the relay device is completely established. If the handover mode corresponds to 0, a legacy D2D communication link is terminated and a communication can be performed in a D2D communication mode via the relay device. In this case, until a resource for the D2D communication with the relay device is allocated, a short communication delay (interruption) may occur.

On the contrary, if the handover mode corresponds 0, a communication with the relay device for a handover and a communication between legacy devices can be alternately performed before a link with the relay device is completely established. If the handover mode corresponds to 1, a legacy D2D communication link is terminated and a communication can be performed in a D2D communication mode via the relay device.

2. 1. 5. Handover Process According to Link Quality

In order to avoid frequent mode change between a D2D communication mode and a D2D communication mode via a relay, a handover request may be different from link quality where a handover is practically performed.

Figure 2:
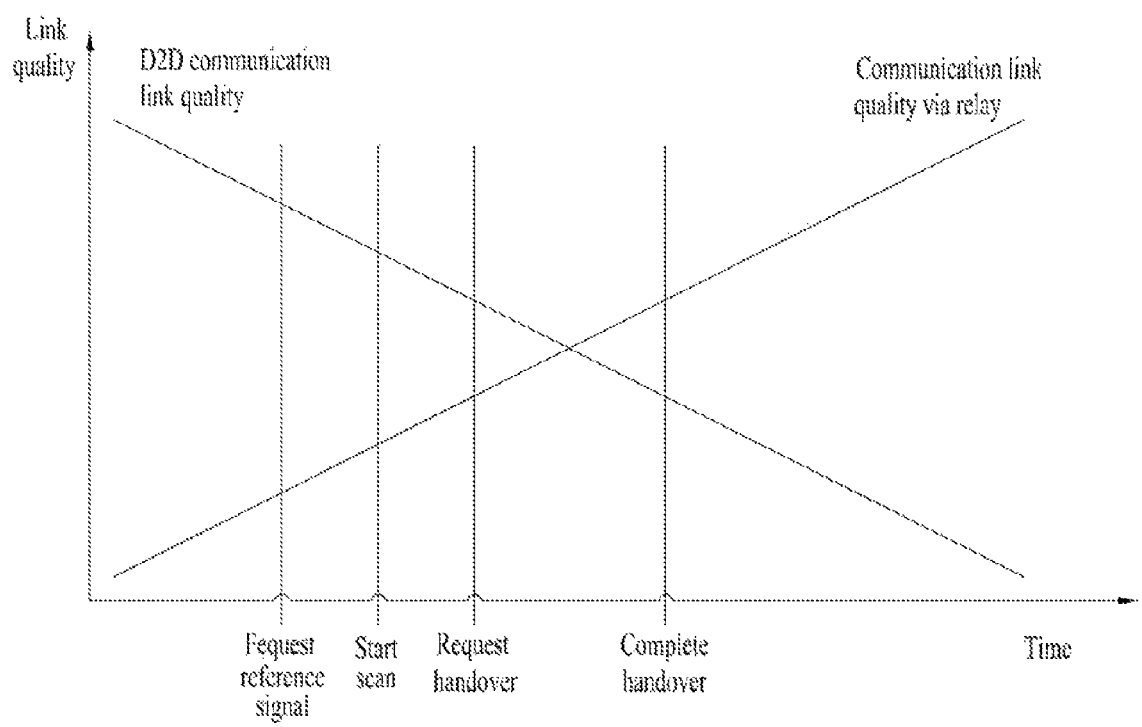
FIG. 2 is a diagram for an example of a link quality level in relation to a handover process according to one embodiment of the present invention.

FIG. 2 is a diagram for an example of a link quality level in relation to a handover process according to one embodiment of the present invention.

Referring to FIG. 2, as a D2D device moves, quality of a D2D communication link between D2D devices and quality of a communication link via a relay may change. The D2D device performing a D2D communication may initiate each operation using specific thresholds.

In this case, if the quality of the D2D communication link with the D2D device performing the D2D communication drops below a threshold for a specific operation, the D2D device can initiate the corresponding operation. Moreover, if the quality of the communication link via the relay is higher than a threshold for a specific operation, the D2D device can initiate the corresponding operation. And, the D2D device may initiate the aforementioned each operation in consideration of the both thresholds for the quality of the D2D communication link and the quality of the communication link via the relay. Yet, FIG. 2 is just an example only for clarity of explanation. A threshold for initiating two or more operations may be identical to each other.

2. 2. Embodiment of Handover Procedure Using Relay Device

In the following description, embodiment of a method for a D2D device performing a D2D communication to make a handover using a D2D communication via a relay device is explained.

2. 2. 1. First Embodiment

Figure 3:
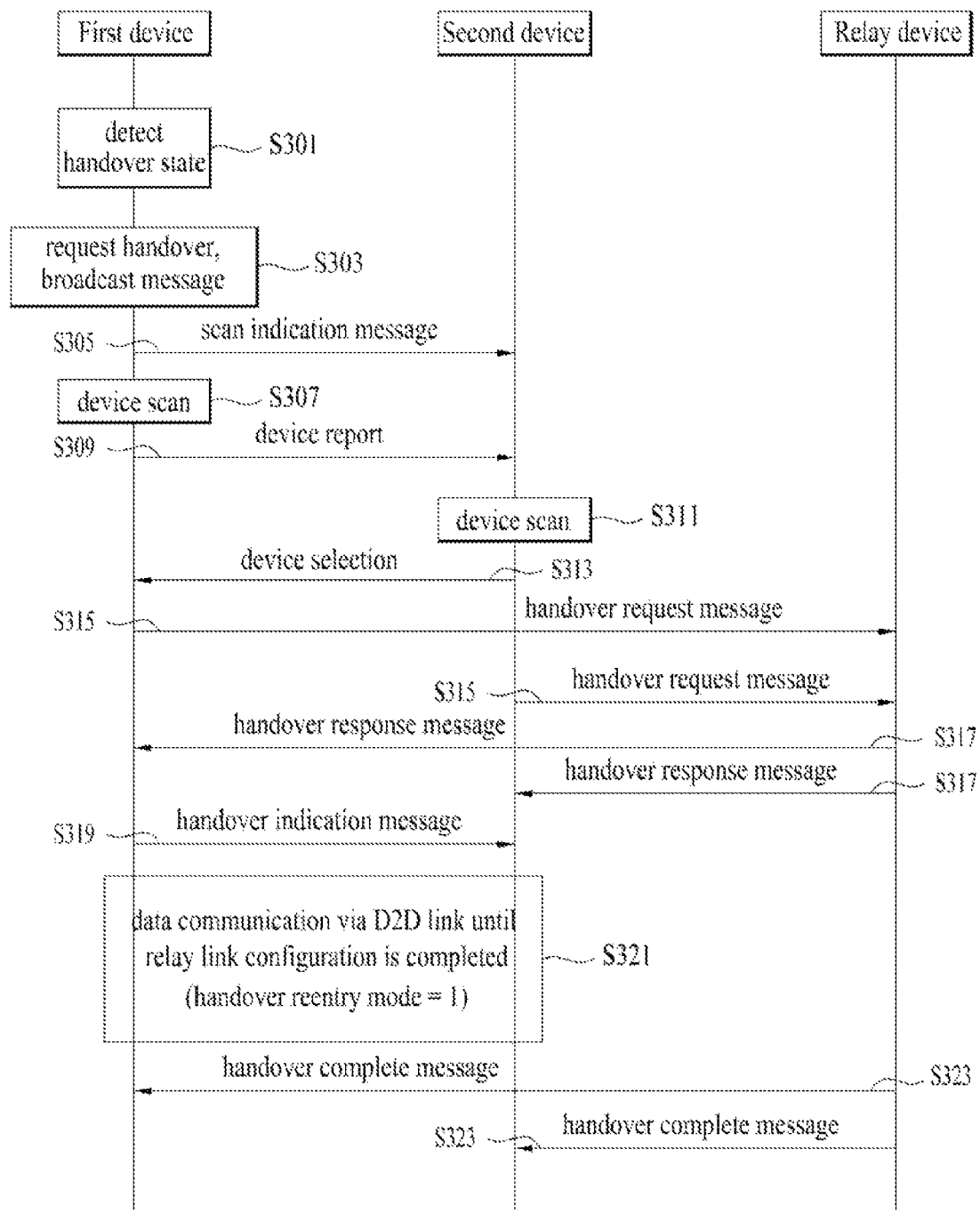
FIG. 3 is a flowchart for an example of a method of making a handover to a relay device while performing a device to device communication according to one embodiment of the present invention.

FIG. 3 is a flowchart for an example of a method of making a handover to a relay device while performing a device to device communication according to one embodiment of the present invention.

Embodiment according to FIG. 3 shows examples of a case (2. 1. 1. 1.) that a neighboring device does not periodically disseminate a reference signal for measuring channel quality and a case (2. 1. 2. 1.) that a D2D device which has transmitted a reference signal request message preferentially measures channel quality.

Referring to FIG. 3, if link quality of a D2D communication drops below a device search threshold, a first device performing the D2D communication with a second device perceives a handover state [S301]. In particular, if the link quality of the D2D communication drops below the device search threshold, the D2D device performing the D2D communication measures channel quality with a neighboring device and starts to search for a relay device.

Subsequently, the first device transmits a reference request message for requesting a transmission of a reference signal with a broadcast scheme [S303].

Having transmitted the reference signal request message, the first device transmits a scan indication message to the second device to enable the second device to measure channel quality with a neighboring device as well [S305].

Having transmitted the scan indication message, the first device scans a neighboring device [S307]. In particular, the first device measures channel quality with the neighboring device using a reference signal received from the neighboring device.

Subsequently, the first device extracts a list of devices having channel quality exceeding a channel quality threshold and transmits the list to the second device via a device report [S309].

Having received the device report from the first device, the second device scans the devices included in the list [S311]. In particular, the second device measures channel quality using reference signals of the devices included in the list only.

Subsequently, the second device selects a candidate group consisting of a single device or a plurality of devices and then transmits the candidate group to the first device via a device selection [S313].

Subsequently, the first device and second device transmit a handover request message to the relay device [S315].

Subsequently, the first device and second device receive a handover response message from the relay device in response to the handover request message [S317]. In this case, as mentioned in the foregoing description, either the first device or the second device may transmit the handover request message and may receive the handover response message in response to the handover request message. In this case, the device, which has transmitted the handover request message, may inform a device not transmitted the handover request message that a handover process has started.

Having received the handover response message from the relay device, the first device transmits a handover indication message to the second device to inform the second device of a start of a handover [S319]. In this case, although it is not depicted, as mentioned in the foregoing description, the second device may also be able to transmit the handover indication message to the first device.

Subsequently, if a handover mode corresponds to 1, a communication with the relay device for a handover and a communication for a D2D communication between the first device and the second device are alternately performed before a link with the relay device is completely established [S321]. In this case, if the handover mode is set to 0, a legacy D2D link is terminated and a communication may immediately start with a D2D communication mode via the relay device. And, a value of the handover mode may be switched to each other.

Subsequently, if the relay device allocates a resource and then a relay link is completely established, the relay device transmits a handover complete (HO COMPLT) message to the first device and the second device [S323]. In this case, the relay device may transmit the handover complete message when both a link to the first device and a link to the second device are all completed. In particular, if one of the links is not completed, the relay device does not transmit the handover complete message. Subsequently, having received the handover complete message from the relay device, the first device and B perform a D2D communication with the relay device using a resource allocated by the relay device.

2. 2. 2. Second Embodiment

Figure 4:
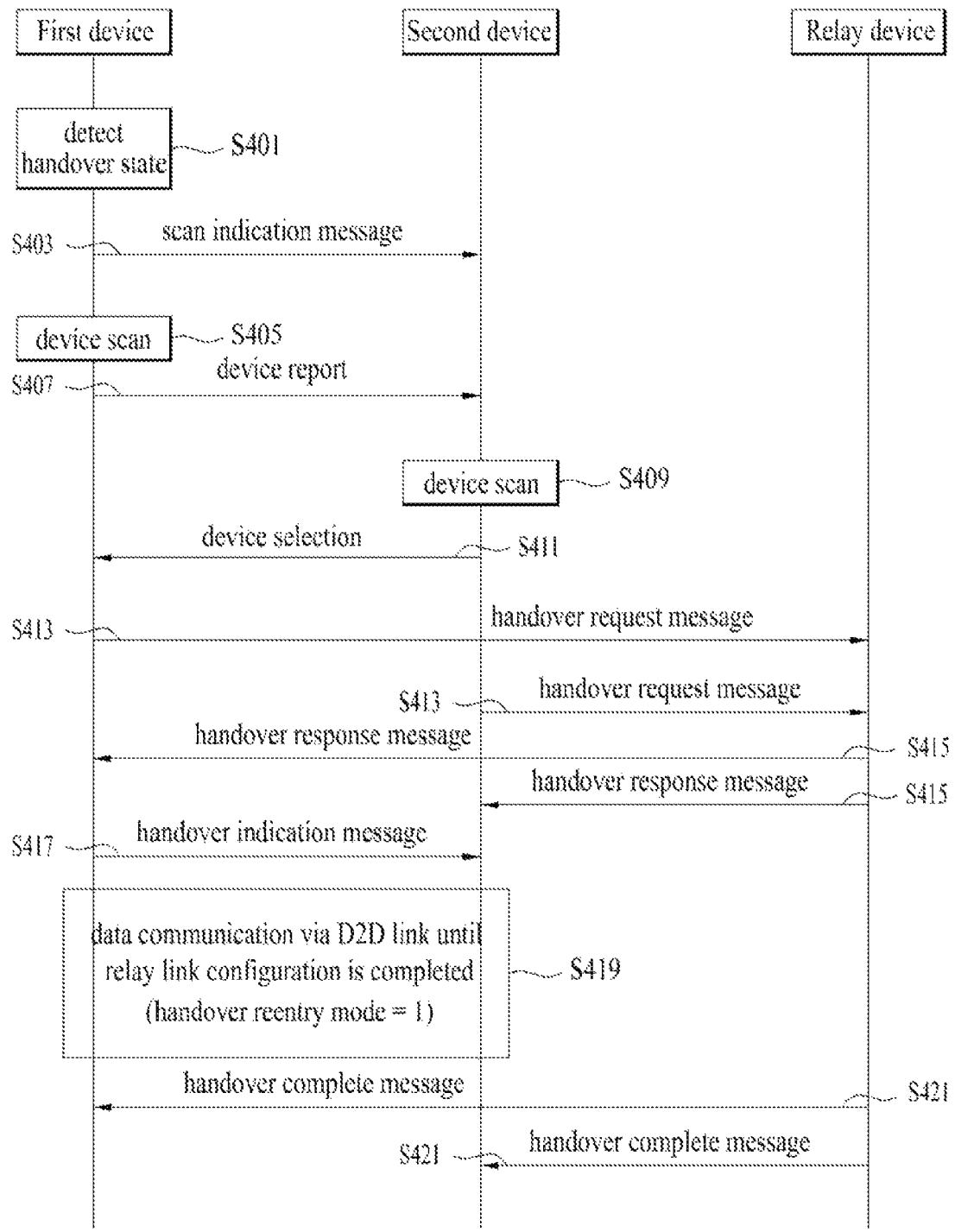
FIG. 4 is a flowchart for an example of a method of making a handover to a relay device while performing a device to device communication according to one embodiment of the present invention.

FIG. 4 is a flowchart for an example of a method of making a handover to a relay device while performing a device to device communication according to one embodiment of the present invention.

Embodiment according to FIG. 4 shows examples of a case (2. 1. 1. 2.) that a neighboring device periodically disseminate a reference signal for measuring channel quality and a case (2. 1. 2. 1.) that a D2D device which has transmitted a reference signal request message preferentially measures channel quality.

Referring to FIG. 4, if a D2D neighboring device periodically disseminates a reference signal for measuring channel quality, the S303 in FIG. 3 may be omitted. In particular, the first device may not transmit a reference signal request message for requesting a transmission of a reference signal with a broadcast scheme.

Since each step of the embodiment of FIG. 4 is identical to the each step of the embodiment of FIG. 3 except the S303, following detailed explanations are omitted.

2. 2. 3. Third Embodiment

Figure 5:
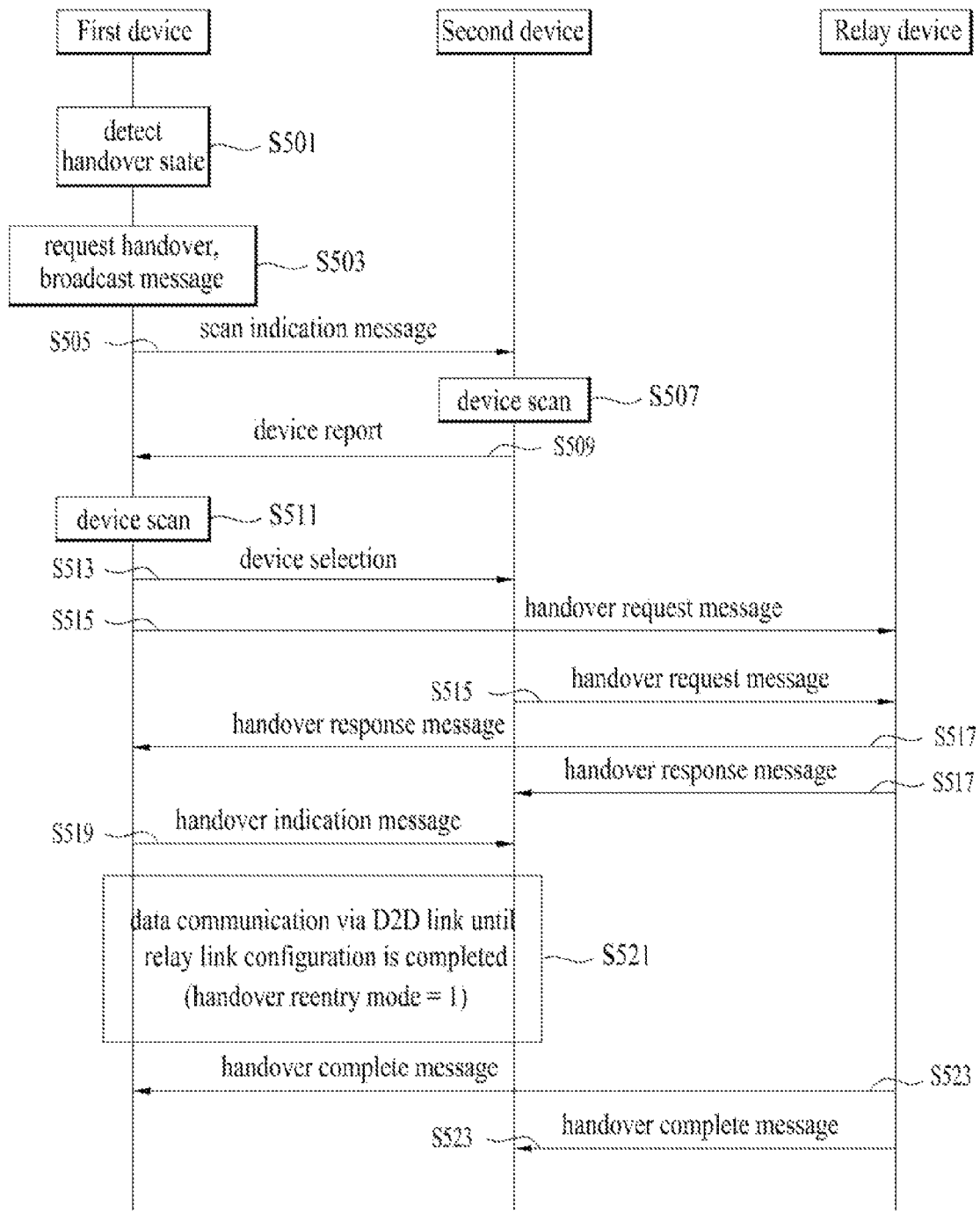
FIG. 5 is a flowchart for an example of a method of making a handover to a relay device while performing a device to device communication according to one embodiment of the present invention.

FIG. 5 is a flowchart for an example of a method of making a handover to a relay device while performing a device to device communication according to one embodiment of the present invention.

Embodiment according to FIG. 5 shows examples of a case (2. 1. 1. 1.) that a neighboring device does not periodically disseminate a reference signal for measuring channel quality and a case (2. 1. 2. 2.) that devices performing a D2D communication simultaneously measure channel quality.

Referring to FIG. 5, if link quality of a D2D communication drops below a device search threshold, a first device performing the D2D communication with a second device perceives a handover state [S501]. In particular, if the link quality of the D2D communication drops below the device search threshold, the D2D device performing the D2D communication measures channel quality with a neighboring device and starts to search for a relay device.

Subsequently, the first device transmits a reference request message for requesting a transmission of a reference signal with a broadcast scheme [S503].

Having transmitted the reference signal request message, the first device transmits a scan indication message to the second device to enable the second device to measure channel quality with a neighboring device as well [S505].

Subsequently, the first device and the second device, which perform a D2D communication, scan (or channel scan) a neighboring device [S507]. In particular, the first device and the second device measure channel quality with the neighboring device using a reference signal received from the neighboring device.

Subsequently, the first device extracts a list of devices having channel quality exceeding a channel quality threshold and transmits the list to the second device via a device report/channel report [S509].

Subsequently, the second device selects a device candidate (group) using both the list received from the first device via the device report and information on the channel quality with the neighboring device measured by the second device and then transmits the device candidate (group) to the first device via a device selection/channel response [S511].

Subsequently, the first device and the second device transmit a handover request message to the relay device [S513].

Subsequently, the first device and second device receive a handover response message from the relay device in response to the handover request message [S515]. In this case, as mentioned in the foregoing description, either the first device or the second device may transmit the handover request message and may receive the handover response message in response to the handover request message. In this case, the device, which has transmitted the handover request message, may inform a device not transmitted the handover request message that a handover process has started.

Having received the handover response message from the relay device, the first device transmits a handover indication message to the second device to inform the second device of a start of a handover [S517]. In this case, although it is not depicted, as mentioned in the foregoing description, the second device may also be able to transmit the handover indication message to the first device.

Subsequently, if a handover mode corresponds to 1, a communication with the relay device for a handover and a communication for a D2D communication between the first device and the second device are alternately performed before a link with the relay device is completely established [S519]. In this case, if the handover mode is set to 0, a legacy D2D link is terminated and a communication may immediately start with a D2D communication mode via the relay device. And, a value of the handover mode may be switched to each other.

Subsequently, if the relay device allocates a resource and then a relay link is completely established, the relay device transmits a handover complete message to the first device and the second device [S521]. In this case, the relay device may transmit the handover complete message when both a link to the first device and a link to the second device are all completed. In particular, if one of the links is not completed, the relay device does not transmit the handover complete message. Subsequently, having received the handover complete message from the relay device, the first device and B perform a D2D communication with the relay device using a resource allocated by the relay device.

2. 2. 4. Fourth Embodiment

Figure 6:
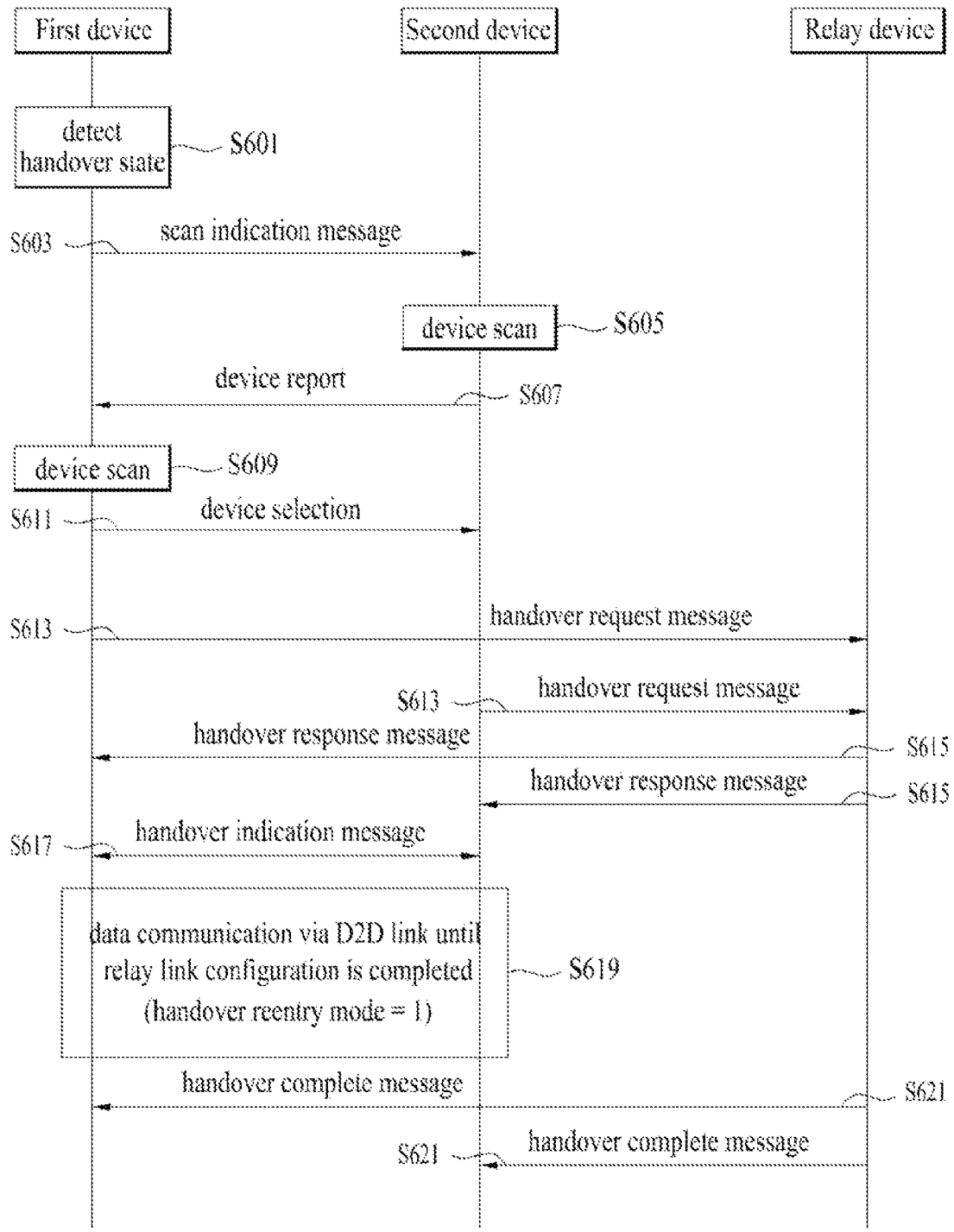
FIG. 6 is a flowchart for an example of a method of making a handover to a relay device while performing a device to device communication according to one embodiment of the present invention.

FIG. 6 is a flowchart for an example of a method of making a handover to a relay device while performing a device to device communication according to one embodiment of the present invention.

Embodiment according to FIG. 6 shows examples of a case (2. 1. 1. 2.) that a neighboring device periodically disseminate a reference signal for measuring channel quality and a case (2. 1. 2. 2.) that devices performing a D2D communication simultaneously measure channel quality.

Referring to FIG. 6, if a D2D neighboring device periodically disseminates a reference signal for measuring channel quality, the S503 in FIG. 5 may be omitted. In particular, the first device may not transmit a reference signal request message for requesting a transmission of a reference signal with a broadcast scheme.

Since each step of the embodiment of FIG. 6 is identical to the each step of the embodiment of FIG. 5 except the S503, following detailed explanations are omitted.

3. Method of Changing a Mode while Performing Direct Communication Between Devices It may be more efficient for a D2D device performing a direct communication between devices to make a handover (mode change) to a cellular network rather than a relay device (third D2D device). For instance, it may be more efficient for a D2D device performing a D2D communication (controlled D2D communication) based on control information received from a base station to make a handover (mode change) to the cellular network.

In the following description, a method of changing a mode is proposed to make a D2D device performing a direct communication between devices seamlessly transmit data.

3. 1. In Case of an Active State in Terms of a Cellular Network

While receiving such control information as resource allocation and the like from a base station, a D2D device performing a controlled D2D communication is in an active state in terms of a cellular network. If the D2D device in the active state recognizes that link quality of a D2D communication is deteriorated, the D2D device can perform a mode change as depicted in an embodiment of FIG. 7.

Figure 7:
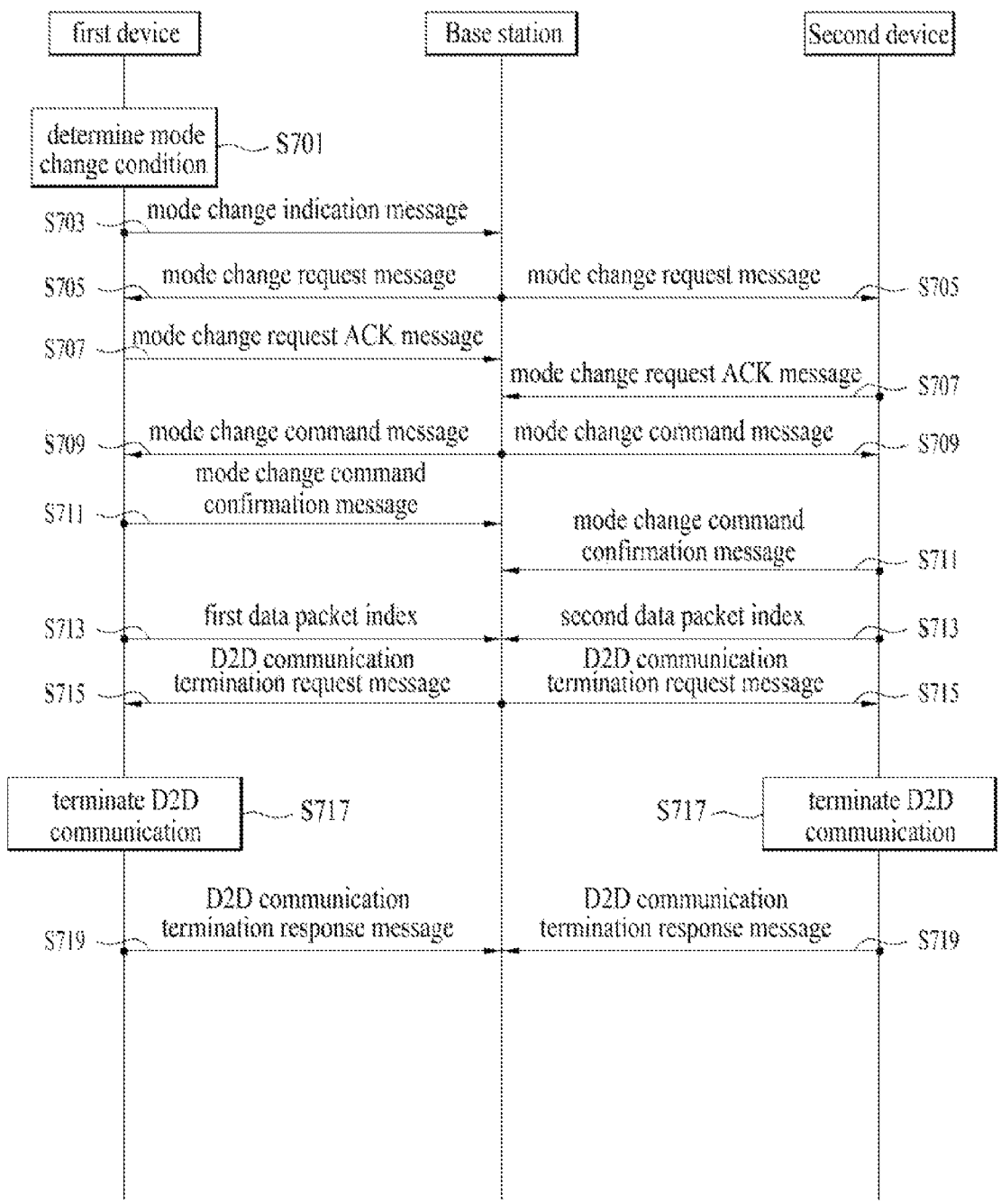
FIG. 7 is a flowchart for an example of a method of performing a mode change while performing a device to device communication according to one embodiment of the present invention.

FIG. 7 is a flowchart for an example of a method of performing a mode change while performing a device to device communication according to one embodiment of the present invention.

Referring to FIG. 7, a first device performing a D2D communication with a second device determines whether a mode change condition for making a handover to a cellular network is satisfied [S701].

The mode change condition indicates a necessity of a handover (mode change) to the cellular network. The mode change condition may include at least one case selected from the group consisting of a case of contiguously receiving a NACK signal more than twice, a case of occurring contiguous timeout, a case that a channel state for a D2D communication is less than a reference value, a case that one of devices performing a D2D communication moves to a different cell, a case that transmit power of one device among the devices performing a D2D communication is greater than a threshold, a case that a distance between devices performing a D2D communication is greater than a prescribed distance, a case that modulation and coding scheme (MCS) level of one device among the devices performing a D2D communication is less than a threshold, a case that channel quality of devices performing a D2D communication is less than a threshold, and a case that devices performing a D2D communication are lack of a radio resource to be allocated to the devices.

Subsequently, if the mode change condition is satisfied, the first device transmits a mode change indication message to a base station for taking charge of a cell including the first device and the second device [S703].

The mode change indication message may include information necessary for comparing D2D communication quality with a cellular network. For instance, the mode change indication message may include link quality of a D2D communication, a station identifier of the first device and that of the second device, and the like.

Having received the mode change indication message, the base station compares D2D communication quality with a cellular network. If the base station determines that a handover (mode change) to the cellular network is efficient, the base station transmits a mode change request message to the first and the second device [S705].

On the other hand, if the base station determines that maintaining a D2D communication is efficient, the base station transmits a message for maintaining the D2D communication to the first and the second device.

Having received the mode change request message, the first and the second device transmit a mode change request ACK (acknowledgement) message to the base station [S707].

The mode change request ACK message is a message for informing that the first and the second device have received the mode change request message from the base station.

Subsequently, having received the mode change request ACK message, the base station transmits a mode change command message to the first and the second device [S709].

The mode change command message is a message for informing the first and the second device of an initiation of a mode change. And, the mode change command message includes allocation information of a resource to which data is transmitted by the first and the second device via the cellular network.

Having received the mode change command message, the first and the second device transmit a mode change command confirmation message to the base station [S711].

The mode change command confirmation message is a message for informing the base station that the first and the second device have received the mode change command message. The mode change command confirmation message can be transmitted to the base station via a resource obtained based on the resource allocation information included in the mode change command message.

Subsequently, the first and the second device transmit a first data packet index and a second data packet index, respectively to the base station for a data packet transmitted via a D2D communication [S713].

The data packet index includes information on data transmitted via the D2D communication. The data packet index is used for a seamless transmission while a handover (mode change) to a cellular network is performed. For instance, before a mode change is performed, the first device may transmit data packets up to a $10^{th}$ data packet to the second device and the second device may receive data packets up to a $9^{th}$ data packet from the first device. In this case, the base station may enable transmission to be started again from the $10^{th}$ data packet after the handover is made to the cellular network.

Moreover, both the S711 and the S713 may be performed at the same time or the mode change command confirmation message may include a data packet index. If the mode change command confirmation message includes a data packet index, resources of the cellular network may be saved.

Subsequently, the base station transmits a D2D communication termination request message to the first and the second device [S715].

The D2D communication termination request message may include information on a data packet firstly transmitted via the cellular network. For instance, if a value of the first data packet index is different from a value of the second data packet index, one data packet index of a smaller value among the data packet indexes can be included in the D2D communication termination request message. By doing so, the first and the second device can transmit a data packet from after the data packet where a transmission and a reception are completed via a D2D communication.

Having received the D2D communication termination request message, the first and the second device terminates a D2D communication [S717].

In particular, the first and the second device release a resource which is allocated to perform the D2D communication.

Subsequently, the first and the second device transmit a D2D communication termination response message to the base station [S719].

The D2D communication termination response message is a message for informing the base station that a D2D communication is terminated and a resource allocated to the D2D communication is released.

By using the aforementioned processes, the first and the second device may terminate a D2D communication and seamlessly transmit data via a cellular network.

3. 2. In Case of an Inactive State in Terms of a Cellular Network

If a D2D device does not receive such control information as resource allocation and the like from a base station, the D2D device is in an inactive (idle, sleep) state in terms of a cellular network.

Figure 8:
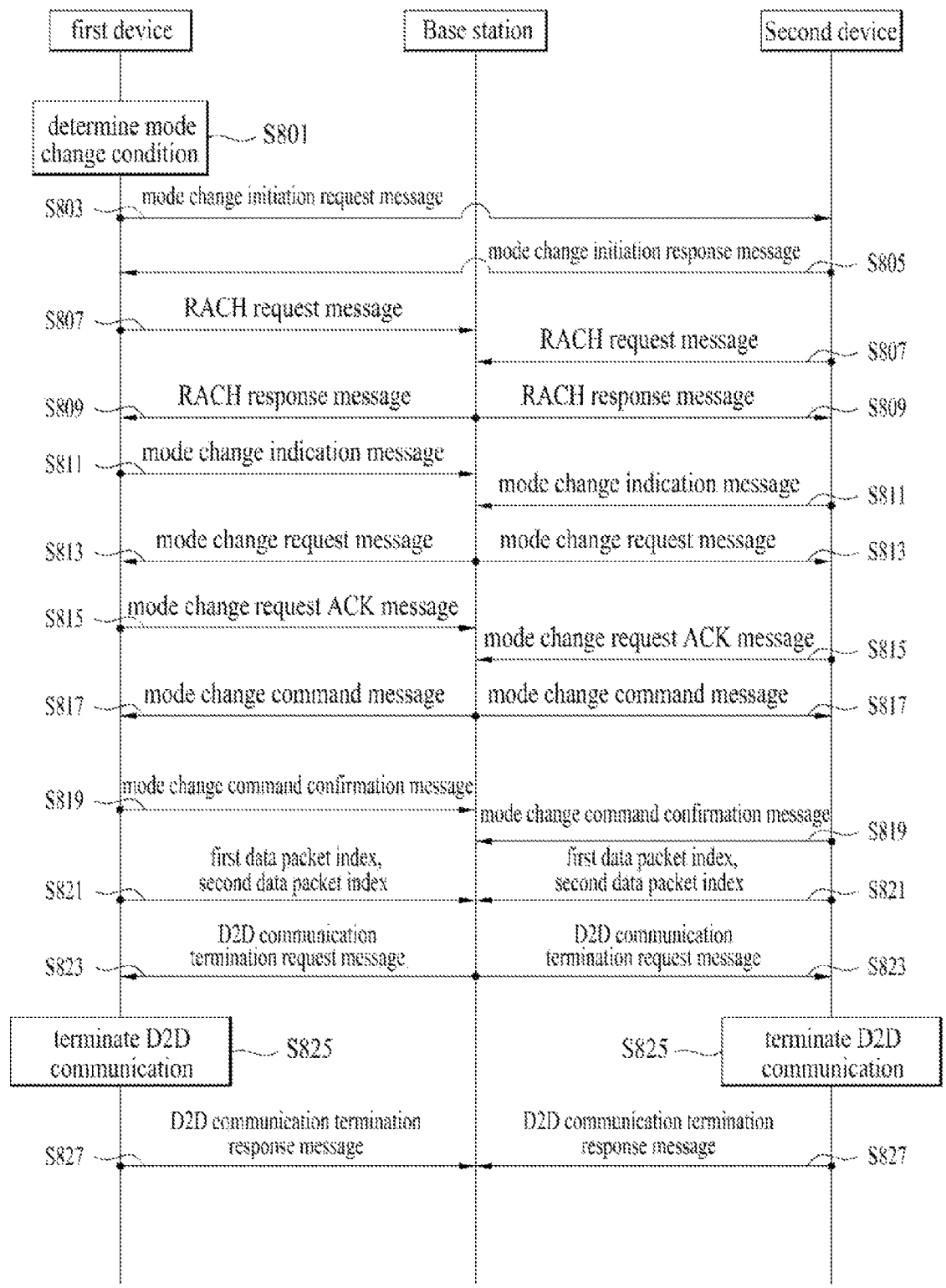
FIG. 8 is a flowchart for an example of a method of performing a mode change while performing a device to device communication according to one embodiment of the present invention.

If the D2D device in the inactive state recognizes that link quality of a D2D communication is deteriorated, the D2D device may perform a handover (mode change) to the cellular network as depicted in an embodiment of FIG. 8.

FIG. 8 is a flowchart for an example of a method of performing a mode change while performing a device to device communication according to one embodiment of the present invention.

Referring to FIG. 8, a first device performing a D2D communication with a second device determines whether a mode change condition for making a handover (mode change) to a cellular network is satisfied [S801].

The mode change condition indicates a necessity of a handover (mode change) to the cellular network. The mode change condition may include at least one case selected from the group consisting of a case of contiguously receiving a NACK signal more than twice, a case of occurring contiguous timeout, a case that a channel state for a D2D communication is less than a reference value, a case that one of devices performing a D2D communication moves to a different cell, a case that transmit power of one device among the devices performing a D2D communication is greater than a threshold, a case that a distance between devices performing a D2D communication is greater than a prescribed distance, a case that modulation and coding scheme (MCS) level of one device among the devices performing a D2D communication is less than a threshold, a case that channel quality of devices performing a D2D communication is less than a threshold, and a case that devices performing a D2D communication are lack of a radio resource to be allocated to the devices.

Subsequently, if the mode change condition is satisfied, the first device transmits a mode change initiation request message to the second device [S803].

The mode change initiation request message is a message for informing the second device of the necessity of a mode change. The mode change initiation message is transmitted by the first device which has recognized the necessity of the mode change.

Having received the mode change initiation request message, the second device transmits a mode change initiation response message to the first device [S805].

The mode change initiation response message is a message for informing that the second device has received the mode change initiation request message.

Subsequently, the first and the second device transmit a RACH (random access channel) request message to a base station [S807].

And, having transmitted the mode change initiation request message, the first device may transmit the RACH request message to the base station before receiving the mode change initiation response message from the second device. In particular, before a handover initiation message is received, the first device may transmit the RACH request message to the base station immediately after the mode change initiation request message is transmitted or in a prescribed time.

Having received the RACH request message, the base station transmits a RACH response message to the first and the second device [S809].

Having received the RACH response message, at least one of the first and the second device transmits a mode change indication message to the base station via a resource obtained by a RACH [S811].

The mode change indication message may include information necessary for comparing D2D communication quality with a cellular network. For instance, the mode change indication message may include link quality of a D2D communication, a station identifier of the first device and that of the second device, and the like.

Having received the mode change indication message, the base station compares D2D communication quality with a cellular network. If the base station determines that performing a mode change is efficient, the base station transmits a mode change request message to the first and the second device [S813].

On the other hand, if the base station determines that maintaining a D2D communication is efficient, the base station transmits a message for maintaining the D2D communication to the first and the second device.

Having received the mode change request message, the first and the second device transmit a mode change request ACK (acknowledgement) message to the base station [S815].

The mode change request ACK message is a message for informing that the first and the second device have received the mode change request message from the base station.

Subsequently, having received the mode change request ACK message, the base station transmits a mode change command message to the first and the second device [S817].

The mode change command message is a message for informing the first and the second device of an initiation of a mode change. And, the mode change command message includes allocation information of a resource to which data is transmitted by the first and the second device via the cellular network.

Having received the mode change command message, the first and the second device transmit a mode change command confirmation message to the base station [S819].

The mode change command confirmation message is a message for informing the base station that the first and the second device have received the mode change command message. The mode change command confirmation message can be transmitted to the base station via a resource obtained based on the resource allocation information included in the mode change command message.

Subsequently, the first and the second device transmit a first data packet index and a second data packet index, respectively to the base station for a data packet transmitted via a D2D communication [S821].

The data packet index includes information on data transmitted via the D2D communication. The data packet index is used for a seamless transmission while a handover (mode change) to a cellular network is performed. For instance, before a mode change is performed, the first device may transmit data packets up to a $10^{th}$ data packet to the second device and the second device may receive data packets up to a $9^{th}$ data packet from the first device. In this case, the base station may enable transmission to be started again from the $10^{th}$ data packet after the handover is made to the cellular network.

Moreover, both the S819 and the S821 may be performed at the same time or the mode change command confirmation message may include a data packet index. If the mode change command confirmation message includes a data packet index, resources of the cellular network may be saved.

Subsequently, the base station transmits a D2D communication termination request message to the first and the second device [S823].

The D2D communication termination request message may include information on a data packet firstly transmitted via the cellular network. For instance, if a value of the first data packet index is different from a value of the second data packet index, one data packet index of a smaller value among the data packet indexes can be included in the D2D communication termination request message. By doing so, the first and the second device can transmit a data packet from after the data packet where a transmission and a reception are completed via a D2D communication.

Having received the D2D communication termination request message, the first and the second device terminates a D2D communication [S825].

In particular, the first and the second device release a resource which is allocated to perform the D2D communication.

Subsequently, the first and the second device transmit a D2D communication termination response message to the base station [S827].

The D2D communication termination response message is a message for informing the base station that a D2D communication is terminated and a resource allocated to the D2D communication is released.

By using the aforementioned processes, the first and the second device may terminate a D2D communication and seamlessly transmit data via a cellular network.

4. The Generals of Device to which the Present Invention is Applicable

Figure 9:
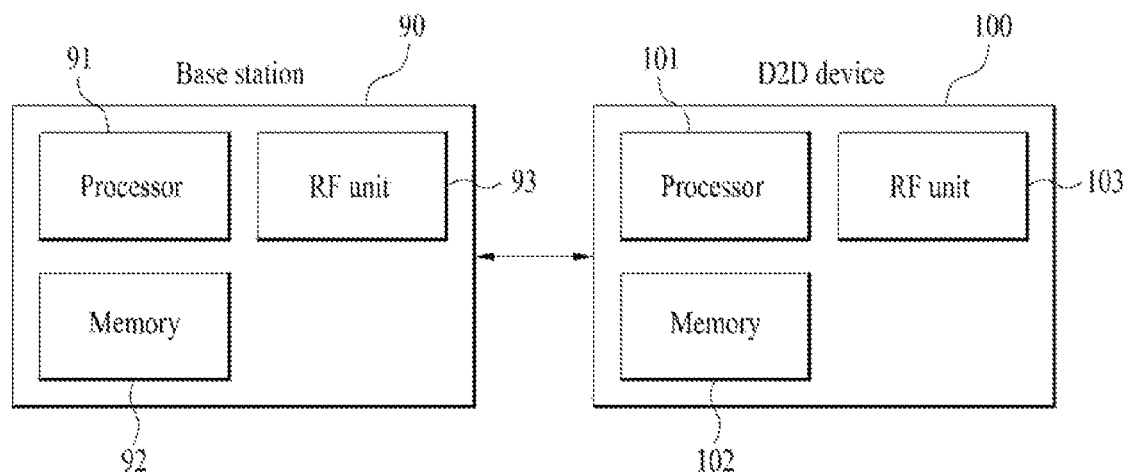
FIG. 9 is a block diagram for an example of a wireless access system according to one embodiment of the present invention.

FIG. 9 is a block diagram for an example of a wireless access system according to one embodiment of the present invention.

Referring to FIG. 9, a wireless communication system includes a base station 90 and a plurality of D2D devices 100 situating in a region of the base station 90. Although FIG. 9 shows an example of communication performed between the base station 90 and the D2D devices 100, A D2D communication method according to the present invention may be applied to a communication performed between D2D devices as well. Moreover, as mentioned in the foregoing description, a relay device may become a base station as well as a D2D device.

A base station 90 includes a processor 91, a memory 92, and an RF (radio frequency) unit 93. The processor 91 implements the proposed functions, processes and/or methods. Layers of a radio interface protocol can be implemented by the processor 91. The memory 92 is connected to the processor 91 and stores various informations to drive the processor 91. The RF unit 93 is connected to the processor 91 and transmits and/or receives a radio signal.

A D2D device 100 includes a processor 101, a memory 102, and an RF (radio frequency) unit 103. The processor 101 implements the proposed functions, processes and/or methods. Layers of a radio interface protocol can be implemented by the processor 101. The memory 102 is connected to the processor 101 and stores various informations to drive the processor 101. The RF unit 103 is connected to the processor 101 and transmits and/or receives a radio signal.

The memory 92/102 may be positioned inside or outside of the processor 91/101 and can be connected with the processor 91/101 by a well-known means. And, the base station 90 and/or the D2D device 100 may include a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Embodiments of the present invention may apply to various wireless access systems. As an example of various wireless access systems, there exist 3GPP ($3^{rd}$ generation partnership project), 3GPP2 and/or IEEE 802 (institute of electrical and electronic engineers 802) system and the like. The embodiments of the present invention can be applied to all technical fields to which the aforementioned various wireless access systems are applied as well as the various wireless access systems.

What is claimed is:

1. A method of performing a mode change, which is performed by a first device performing a device-to-device communication in a wireless access system, the method comprising:

determining whether a mode change condition for performing a handover to a cellular network is satisfied while performing the device-to-device communication;

transmitting a mode change indication message to a base station when the mode change condition is satisfied;

receiving a mode change command message from the base station to initiate the mode change;

transmitting a first data packet index for a data packet, which is lastly transmitted to a second device via the device-to-device communication, to the base station;

when a device-to-device communication termination request message is received from the base station, terminating the device-to-device communication with the second device; and transmitting data to the second device via the cellular network, wherein the device-to-device communication termination request message includes a third data packet index for a data packet firstly transmitted via the cellular network by comparing the first data packet index and a second data packet index, and wherein the second data packet index indicates a data packet which is lastly received by the second device via the device-to-device communication.

2. The method of claim 1, wherein the third data packet index corresponds to a smaller value among the first data packet index and the second data packet index.

3. The method of claim 1, wherein the mode change indication message comprises quality information of a link between the first device and the second device.

4. A method of performing a mode change, which is performed by a first device performing a device-to-device communication in a wireless access system, comprising the steps of:

determining whether a mode change condition for performing a handover to a cellular network is satisfied while performing the device-to-device communication;

transmitting a RACH request message to a base station when the mode change condition is satisfied;

transmitting a mode change indication message to the base station via a resource obtained by transmitting the RACH request message;

receiving a mode change command message from the base station to initiate the mode change;

transmitting a first data packet index for a data packet, which is lastly transmitted to a second device via the device-to-device communication, to the base station, when a device-to-device communication termination request message is received from the base station, terminating the device-to-device communication with the second device; and transmitting data to the second device via the cellular network, wherein the device-to-device communication termination request message includes a third data packet index for a data packet firstly transmitted via the cellular network by comparing the first data packet index and a second data packet index, and wherein the second data packet index indicates a data packet which is lastly received by the second device via the device-to-device communication.

5. The method of claim 4, wherein the third data packet index corresponds to a smaller value among the first data packet index and the second data packet index.

6. The method of claim 4, wherein the mode change indication message comprises quality information of a link between the first device and the second device.

7. A device for performing a mode change while performing a device-to-device communication in a wireless access system, comprising:

a radio frequency (RF) unit configured to comprise a transmitter and a receiver; and a processor configured to support the mode change, the processor configured to:

determine whether a mode change condition for performing a handover to a cellular network is satisfied while performing the device-to-device communication, transmit a mode change indication message to a base station via the RF unit when the mode change condition is satisfied, receive a mode change command message from the base station via the RF unit to initiate the mode change, transmit a first data packet index for a data packet, which is lastly transmitted by a second device via the device-to-device communication, to the base station via the RF unit, when a device-to-device communication termination request message is received from the base station, terminate the device-to-device communication with the second device, and transmit data to the second device via the cellular network using the RF module, wherein the device-to-device communication termination request message includes a third data packet index for a data packet firstly transmitted via the cellular network by comparing the first data packet index and a second data packet index, and wherein the second data packet index indicates a data packet which is lastly received by the second device via the device-to-device communication.

8. The device of claim 7, wherein the mode change indication message comprises quality information of a link between the first device and the second device.

9. The device of claim 7, wherein when the mode change condition is satisfied, the processor is configured to transmit a RACH request message to the base station via the RF unit and wherein the processor is configured to transmit the mode change indication message to the base station via a resource obtained by transmitting the RACH request message using the RF unit.

* * * * *